United States Patent
Ghaemi et al.

(10) Patent No.: US 10,698,893 B2
(45) Date of Patent: Jun. 30, 2020

(54) HIERARCHICAL BLENDING

(71) Applicant: SAP SE, Walldorf (DE)

(72) Inventors: Houman Ghaemi, Vancouver (CA); Manuel Dewald, Edingen (DE); Irena Kofman, Vancouver (CA); Peter Tippet, North Vancouver (CA)

(73) Assignee: SAP SE, Walldorf (DE)

( * ) Notice: Subject to any disclaimer, the term of this patent is extended or adjusted under 35 U.S.C. 154(b) by 455 days.

(21) Appl. No.: 15/391,153

(22) Filed: Dec. 27, 2016

(65) Prior Publication Data
US 2018/0181617 A1 Jun. 28, 2018

(51) Int. Cl.
*G06F 7/00* (2006.01)
*G06F 16/00* (2019.01)
*G06F 16/2453* (2019.01)
*G06F 16/22* (2019.01)
*G06F 16/248* (2019.01)
*G06F 16/27* (2019.01)

(52) U.S. Cl.
CPC ...... *G06F 16/24544* (2019.01); *G06F 16/221* (2019.01); *G06F 16/248* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 8,229,944 B2 * | 7/2012 | Latzina | G06F 17/2785 707/759 |
| 9,633,076 B1 * | 4/2017 | Morton | G06F 16/248 |
| 2004/0064456 A1 * | 4/2004 | Fong | G06F 16/283 |
| 2007/0214179 A1 * | 9/2007 | Hoang | G06F 16/2428 |
| 2008/0059413 A1 * | 3/2008 | Evans | G06Q 10/06 |
| 2015/0278273 A1 * | 10/2015 | Wigington | G06F 16/185 707/797 |
| 2015/0363465 A1 * | 12/2015 | Bordawekar | G06F 16/24542 707/718 |
| 2016/0350393 A1 * | 12/2016 | Zheng | G06F 16/283 |

* cited by examiner

*Primary Examiner* — Tuan A Pham
(74) *Attorney, Agent, or Firm* — Buckley, Maschoff & Talwalkar LLC

(57) ABSTRACT

A system includes reception, from a client device, a database query over a first data source and a second data source, the first data source comprising a first linking entity and the second data source comprising a second linking entity, the first linking entity identified by two or more columns of the first data source defining a first hierarchy, linking of the first data source and the second data source on the first linking entity and the second linking entity, execution of a blended query on the linked data sources based on the database query to generate a result set, and transmission of the result set to the client device.

18 Claims, 21 Drawing Sheets

Dataset 1 - Inventory is aggregated with SUM

| Product | Region | Inventory |
|---|---|---|
| Burgers | NA | 400 |
| Burgers | EMEA | 200 |
| Cheetos | NA | 1200 |
| Tubas | EMEA | 10 |
| Noseflutes | NA | 20 |
| Noseflutes | APJ | 80 |
| Bicycles | APJ | 50 |
| Unicycles | NA | 5 |

Hierarchy 1 - Products

| Product | Parent |
|---|---|
| Burgers | Food |
| Cheetos | Food |
| Tubas | Instruments |
| Noseflutes | Instruments |
| Bicycles | Vehicles |
| Unicycles | Vehicles |
| Instruments | (all) |
| Food | (all) |
| Vehicles | (all) |

Dataset 2 - Sales is aggregated as AVG

| Prod | Manager | Sales |
|---|---|---|
| Burgers | D.A. | 40 |
| Burgers | Ralphie | 80 |
| Cheetos | Ralphie | 65 |
| Beans | Arnold | 70 |
| Instruments | Keesha | 70 |
| Instruments | Phoebe | 40 |
| Instruments | D.A. | 40 |
| Noseflutes | Carlos | 45 |
| Vehicles | Ms. Frizzle | 75 |

| Product | Inventory | Sales |
|---|---|---|
| -(all) | 1965 | ((5)) |
| --Food | 1800 | ((2)) |
| ---Burgers | 600 | 60 |
| ---Cheetos | 1200 | 65 |
| --Instruments | 110 | 50 |
| ---Tubas | 10 | ---- |
| ---Noseflutes | 100 | 45 |
| --Vehicles | 55 | 75 |
| ---Bicycles | 50 | ---- |
| ---Unicycles | 5 | ---- |

220

| Product | Inventory | Sales |
|---|---|---|
| -(all) | 1965 | 245 |
| --Food | 1800 | 135 |
| --Burgers | 600 | 60 |
| --Cheetos | 1200 | 65 |
| --Instruments | 110 | 45 |
| --Tubas | 10 | ---- |
| --Noseflutes | 100 | 45 |
| --Vehicles | 55 | 75 |
| --Bicycles | 50 | ---- |
| --Unicycles | 5 | ---- |

230

| Prod | Inventory | Sales |
|---|---|---|
| Burgers | 600 | 60 |
| Cheetos | 1200 | 65 |
| Beans | 65 | 70 |
| Instruments | 110 | 50 |
| Noseflutes | 100 | 45 |
| Vehicles | 55 | 75 |

*FIG. 2B*

| Product | Region | Manager | Inventory | Sales |
|---|---|---|---|---|
| -(all) | APJ | ((6)) | 130 | ((3)) |
|  | EMEA | ((6)) | 210 | ((2)) |
|  | NA | ((6)) | 1885 | ((3)) |
| --Food | EMEA | ((2)) | 200 | ((1)) |
|  | NA | ((2)) | 1600 | ((2)) |
| ---Burgers | EMEA | ((2)) | 200 | 60 |
|  | NA | ((3)) | 400 | 60 |
| ---Cheetos | NA | Ralphie | 1200 | 65 |
| --Instruments | APJ | ((3)) | 20 | 50 |
|  | EMEA | ((3)) | 10 | 50 |
|  | NA | ((3)) | 80 | 50 |
| ---Tubas | EMEA | — | 10 | — |
| ---Noseflutes | APJ | Carlos | 20 | 45 |
|  | NA | Carlos | 60 | 45 |
| ---Vehicles | APJ | Ms. Frizzle | 50 | 75 |
|  | NA | Ms. Frizzle | 5 | 75 |
| ----Bicycles | APJ | — | 50 | — |
| ----Unicycles | NA | — | 5 | — |

240

| Product | Region | Manager | Inventory | Sales |
|---|---|---|---|---|
| -(all) | APJ | ((6)) | 130 | 245 |
|  | EMEA | ((6)) | 210 | 245 |
|  | NA | ((6)) | 1885 | 245 |
| --Food | EMEA | ((2)) | 200 | 125 |
|  | NA | ((2)) | 1600 | 125 |
| ---Burgers | EMEA | ((2)) | 200 | 60 |
|  | NA | ((2)) | 400 | 60 |
| ---Cheetos | NA | Ralphie | 1200 | 65 |
| --Instruments | APJ | ((3)) | 20 | 45 |
|  | EMEA | ((3)) | 10 | 45 |
|  | NA | ((3)) | 80 | 45 |
| ---Tubas | EMEA | — | 10 | — |
| ---Noseflutes | APJ | Carlos | 20 | 45 |
|  | NA | Carlos | 60 | 45 |
| ---Vehicles | APJ | Ms. Frizzle | 50 | 75 |
|  | NA | Ms. Frizzle | 5 | 75 |
| ---Bicycles | APJ | Ms. Frizzle | 50 | — |
| ---Unicycles | NA | Ms. Frizzle | 5 | — |

Dataset 1 - Inventory is aggregated with SUM

| Product | Inventory |
|---|---|
| Pork Bellies | 120 |
| Burgers | 600 |
| Cheetos | 1200 |
| Tubas | 10 |
| Noseflutes | 100 |
| Bicycles | 50 |
| Unicycles | 5 |

Hierarchy 1 - Products

| Product | Parent |
|---|---|
| Pork Bellies | Food |
| Burgers | Food |
| Cheetos | Food |
| Tubas | Instruments |
| Noseflutes | Instruments |
| Bicycles | Vehicles |
| Unicycles | Vehicles |
| Instruments | (all) |
| Food | (all) |
| Vehicles | (all) |

Dataset 2 - Sales is aggregated as AVG

| Prod | Sales |
|---|---|
| Cheeseburgers | 60 |
| Veggie "burgers" | 1 |
| Cheetos | 65 |
| Beans | 70 |
| Instruments | 50 |
| Pogo sticks | 25 |
| Scooters | 50 |
| Pets | 55 |

Hierarchy 2 - Prod

| Prod | Parent |
|---|---|
| Cheeseburgers | Burgers |
| Veggie "burgers" | Burgers |
| Burgers | Restaurant |
| Cheetos | Retail |
| Beans | Retail |
| Pogo sticks | Vehicles |
| Scooters | Vehicles |
| Restaurant | (all) |
| Retail | (all) |
| Instruments | (all) |
| Vehicles | (all) |
| Pets | (all) |

Dataset 1 - Sales is aggregated with SUM, has a level hierarchy with Product_Type->Product_Category-> Product_Color

| Product_Type | Product_Category | Product_Color | Sales |
|---|---|---|---|
| Vehicles | Cars | Red | 50 |
| Vehicles | Cars | Purple | 90 |
| Vehicles | Bicycles | Yellow | 240 |
| Vehicles | Bicycles | Pink | 40 |
| Toys | Wagons | Red | 100 |
| Toys | Wagons | Pink | 130 |
| Toys | Bicycles | Blue | 55 |

Dataset 2 - Inventory is aggregated with SUM, has a level hierarchy with Type->Category->Product

| Type | Category | Product | Inventory |
|---|---|---|---|
| Toys | Cars | Matchbox | 100 |
| Toys | Cars | Hasbro | 30 |
| Vehicles | Bicycles | BMX | 15 |
| Vehicles | Bicycles | Road | 10 |
| Toys | Wagons | Radio Flyer | 40 |
| Toys | Wagons | Red | 20 |
| Toys | Bicycles | Strider | 45 |
| Toys | Bicycles | Skoot | 35 |

| Product_Type | Product_Category | Product_Color | Product | Sales | Inventory |
|---|---|---|---|---|---|
| Vehicles | Cars | Red | —— | 50 | —— |
|  |  | Purple | —— | 90 | —— |
|  | Bicycles | Yellow | ((2)) | 240 | 25 |
|  |  | Pink | ((2)) | 40 | 25 |
| Toys | Wagons | Red | ((2)) | 100 | 60 |
|  |  | Pink | ((2)) | 130 | 60 |
|  | Bicycles | Blue | ((2)) | 55 | 80 |

420

| Product_Type | Product_Category | Product_Color | Product | Sales | Inventory |
|---|---|---|---|---|---|
| Vehicles | Bicycles | ((2)) | BMX | 380 | 15 |
|  |  |  | Road | 280 | 10 |
| Toys | Wagons | ((2)) | Radio Flyer | 230 | 40 |
|  |  |  | Red | 230 | 30 |
|  | Bicycles | Blue | Strider | 55 | 45 |
|  |  |  | Skoot | 55 | 35 |
|  | Cars | —— | Matchbox | —— | 100 |
|  |  |  | Hasbro | —— | 30 |

430

| Product Type | Product Category | Product Color | Product | Sales | Inventory |
|---|---|---|---|---|---|
| Vehicles | Cars | ((2)) | —— | 140 | —— |
|  | Bicycles | ((2)) | ((2)) | 280 | 25 |
| Toys | Wagons | ((2)) | ((2)) | 230 | 60 |
|  | Bicycles | Blue | ((2)) | 55 | 80 |
|  | Cars | —— | ((2)) | —— | 130 |

Dataset 1 - Sales is aggregated with SUM, has a level hierarchy with CustCountry->CustRegion->CustCity

| CustCountry | CustRegion | CustCity | Sales |
|---|---|---|---|
| Australia | New South Wales | Sydney | 80 |
| Canada | Ontario | Toronto | 50 |
| Canada | Ontario | London | 90 |
| UK | England | London | 240 |
| US | New York | New York | 40 |
| US | Oregon | Springfield | 100 |
| US | Ohio | Springfield | 130 |

Dataset 2 - NumSalespeople is aggregated with SUM, has a level hierarchy with Country -> City

| Area | Country | City | NumSalespeople |
|---|---|---|---|
| NA | Canada | Toronto | 40 |
| NA | Canada | London | 50 |
| EMEA | UK | London | 20 |
| EMEA | France | Paris | 30 |
| NA | US | New York | 10 |
| NA | US | Springfield | 15 |
| NA | US | Springfield | 10 |

| CustCountry | CustRegion | CustCity | Sales | NumSalespeople |
|---|---|---|---|---|
| Australia | New South Wales | Sydney | 80 | ----- |
| Canada | Ontario | London | 90 | 50 |
|  | Ontario | Toronto | 50 | 40 |
| UK | England | London | 240 | 20 |
| US | New York | New York | 40 | 10 |
|  | Ohio | Springfield | 130 | ----- |
|  | Oregon | Springfield | 100 | 25 |

*620*

| CustCountry | CustRegion | CustCity | Sales | NumSalespeople |
|---|---|---|---|---|
| Canada | Ontario | London | 90 | 50 |
|  | Ontario | Toronto | 50 | 40 |
| France | ----- | Paris | ----- | 30 |
| UK | England | London | 240 | 20 |
| US | New York | New York | 40 | 10 |
|  | Oregon | Springfield | 100 | 25 |

*630*

| Area | Country | City | Sales | NumSalespeople |
|---|---|---|---|---|
| ----- | Australia | Sydney | 80 | ----- |
| EMEA | UK | London | 240 | 20 |
| NA | Canada | London | 90 | 50 |
|  |  | Toronto | 50 | 40 |
|  | US | New York | 40 | 10 |
|  |  | Springfield | 130 | ----- |
|  |  | Springfield | 100 | 25 |

*640*

| Area | Country | City | Sales | NumSalespeople |
|---|---|---|---|---|
| EMEA | France | Paris | ----- | 30 |
|  | UK | London | 240 | 20 |
| NA | Canada | London | 90 | 50 |
|  |  | Toronto | 50 | 40 |
|  | US | New York | 40 | 10 |
|  |  | Springfield | 100 | 25 |

*FIG. 6B*

Dataset 1 - Sales is aggregated with SUM, has a level hierarchy with CustCountry->CustRegion->CustCity

| CustCountry | CustRegion | CustCity | Sales |
|---|---|---|---|
| Canada | Ontario | Toronto | 50 |
| Canada | Ontario | London | 90 |
| UK | England | London | 240 |
| US | New York | New York | 40 |
| US | Oregon | Springfield | 100 |
| US | Ohio | Springfield | 130 |

Dataset 2 - NumSalespeople is aggregated with SUM, has a level hierarchy with Area -> Country -> City

| Area | Country | City | NumSalespeople |
|---|---|---|---|
| NA | Canada | Toronto, Ontario | 40 |
| NA | Canada | London, Ontario | 50 |
| NA | Canada | Vancouver, BC | 45 |
| EMEA | UK | London, England | 20 |
| NA | US | New York | 30 |
| NA | US | New York, New York | 10 |
| NA | US | Springfield, Oregon | 15 |
| NA | US | Springfield, Oregon | 10 |

| CustCountry | CustRegion | CustCity | Sales | NumSalespeople |
|---|---|---|---|---|
| Canada | Ontario | London | 90 | 50 |
|  | Ontario | Toronto | 50 | 40 |
| UK | England | London | 240 | 20 |
| US | New York | New York | 40 | 10 |
|  | Ohio | Springfield | 130 | --- |
|  | Oregon | Springfield | 100 | 25 |

720

| CustCountry | CustRegion | CustCity | Sales | NumSalespeople |
|---|---|---|---|---|
| Canada | BC | Vancouver | --- | 45 |
|  | Ontario | London | 90 | 50 |
|  | Ontario | Toronto | 50 | 40 |
| UK | England | London | 240 | 20 |
| US | --- | --- | --- | 30 |
|  | New York | New York | 40 | 10 |
|  | Oregon | Springfield | 100 | 25 |

730

| Area | Country | City | Sales | NumSalespeople |
|---|---|---|---|---|
| EMEA | UK | London, England | 240 | 20 |
| NA | Canada | London, Ontario | 90 | 50 |
|  |  | Toronto, Ontario | 50 | 40 |
|  | US | New York, New York | 40 | 10 |
|  |  | Springfield, Ohio | 130 | --- |
|  |  | Springfield, Oregon | 100 | 25 |

740

| Area | CustCountry | City | Sales | NumSalespeople |
|---|---|---|---|---|
| EMEA | UK | London, England | 240 | 20 |
| NA | Canada | Vancouver, BC | --- | 45 |
|  |  | London, Ontario | 90 | 50 |
|  |  | Toronto, Ontario | 50 | 40 |
|  | US | New York | --- | 30 |
|  |  | New York, New York | 40 | 10 |
|  |  | Springfield | 100 | 25 |

FIG. 7B

Dataset 1 - Sales is aggregated with SUM, has a level hierarchy with FiscalYear -> FiscalQuarter -> SaleDate

| FiscalYear | FiscalQuarter | SaleDate | Sales |
|---|---|---|---|
| 2012 | Q2 | 2012-08-06 | 50 |
| 2012 | Q3 | 2012-09-15 | 80 |
| 2012 | Q3 | 2012-10-31 | 340 |
| 2012 | Q4 | 2012-12-25 | 40 |
| 2012 | Q4 | 2013-02-11 | 100 |
| 2013 | Q1 | 2013-03-25 | 130 |
| 2013 | Q2 | 2013-04-05 | 60 |

Dataset 2 - Inventory is aggregated with SUM

| Date | Inventory |
|---|---|
| 2012-08-06 09:00 | 40 |
| 2012-08-06 13:00 | 50 |
| 2012-09-11 09:00 | 20 |
| 2012-09-15 13:00 | 10 |
| 2012-10-31 09:00 | 15 |
| 2012-12-25 13:00 | 10 |
| 2013-02-11 09:00 | 40 |
| 2013-03-25 13:00 | 20 |

Dataset 1 - Sales is aggregated with SUM, has a level hierarchy with FiscalYear -> FiscalQuarter -> SaleDate

| SaleDate | Sales |
|---|---|
| 2012-08-06 09:00 | 50 |
| 2012-09-17 15:00 | 90 |
| 2012-10-25 10:00 | 240 |
| 2012-12-31 15:00 | 40 |
| 2013-02-28 10:00 | 100 |
| 2013-03-08 15:00 | 130 |
| 2013-04-12 10:00 | 60 |

Dataset 2 - Inventory is aggregated with SUM

| Date | Inventory |
|---|---|
| 2012-08-06 09:00 | 40 |
| 2012-08-06 13:00 | 50 |
| 2012-09-11 09:00 | 20 |
| 2012-09-15 13:00 | 10 |
| 2012-10-31 09:00 | 15 |
| 2012-12-25 13:00 | 10 |
| 2013-02-11 09:00 | 40 |
| 2013-03-25 13:00 | 20 |

*FIG. 9A*

| Date | Sales | Inventory |
|---|---|---|
| 2012-08-06 09:00 | 50 | 40 |
| 2012-08-06 13:00 | 50 | 50 |
| 2012-09-11 09:00 | 90 | 20 |
| 2012-09-15 13:00 | 90 | 10 |
| 2012-10-31 09:00 | 240 | 15 |
| 2012-12-25 13:00 | 40 | 10 |
| 2013-02-11 09:00 | 100 | 40 |
| 2013-03-25 13:00 | 130 | 20 |

910

| SaleDate | Sales | Inventory |
|---|---|---|
| 2012-08-06 09:00 | 50 | 90 |
| 2012-09-17 15:00 | 90 | 30 |
| 2012-10-25 10:00 | 240 | 15 |
| 2012-12-31 15:00 | 40 | 10 |
| 2013-02-28 10:00 | 100 | 40 |
| 2013-03-08 15:00 | 130 | 20 |
| 2013-04-12 10:00 | 60 | ---- |

| Product | Inventory | Sales |
|---|---|---|
| - (all) | 2085 | 47 |
| --Food | 1920 | ((2)) |
| ---Pork Bellies | 120 | ----- |
| ---Burgers | 600 | 30.5 |
| ---- Cheeseburgers | ----- | 60 |
| ---- Veggie "burgers" | ----- | 1 |
| ---Cheetos | 1200 | 65 |
| --Instruments | 110 | 50 |
| ---Tubas | 10 | ----- |
| ---Noseflutes | 100 | ----- |
| --Vehicles | 55 | 37.5 |
| ---Bicycles | 50 | ----- |
| ---Unicycles | 5 | ----- |
| ---- Pogo sticks | ----- | 25 |
| --- Scooters | ----- | 50 |
| -- Restaurant | ----- | 30.5 |
| -- Retail | ----- | 67.5 |
| --- Beans | ----- | 70 |

*FIG. 10A*

| Product | Inventory | Sales |
|---|---|---|
| - (all) | 2085 | 321 |
| --Food | 1920 | 126 |
| ---Pork Bellies | 120 | ----- |
| ---Burgers | 600 | 61 |
| ---- Cheeseburgers | 600 | 60 |
| ---- Veggie "burgers" | 600 | 1 |
| ---Cheetos | 1200 | 65 |
| --Instruments | 110 | 50 |
| ---Tubas | 10 | ----- |
| ---Noseflutes | 100 | ----- |
| --Vehicles | 55 | 75 |
| ---Bicycles | 50 | ----- |
| ---Unicycles | 5 | ----- |
| --- Pogo sticks | ----- | 25 |
| --- Scooters | ----- | 50 |
| -- Retail | ----- | 70 |
| --- Beans | ----- | 70 |

*FIG. 10B*

HIERARCHICAL BLENDING

BACKGROUND

Data blending is a method for combining data from two data sources. In contrast to a traditional left join, a blended result set includes all rows from the primary data source. For each row of the primary data source is joined with a single aggregated row of all rows of the secondary data source which match rows in the primary data source. The matching is based on specified linkages between entities of the data sources, and the aggregation of a measure of the second data source is performed based on the aggregation type associated with the measure.

The linked entities of one or both data sources may belong to a dimension hierarchy. Conventional blending is often unsuitable in such a scenario because the models of each data source may not exhibit the same level of granularity. In a further complication, the linked entities may reflect different hierarchies, including different types of hierarchies.

BRIEF DESCRIPTION OF THE DRAWINGS

FIG. 2A illustrates a first data set, a parent-child hierarchy of the first dataset, and a second dataset according to some embodiments.

FIG. 2B illustrates blended result sets based on the FIG. 2A datasets according to some embodiments.

FIG. 2C illustrates blended result sets based on the FIG. 2A datasets according to some embodiments.

FIG. 3A illustrates a first data set, a parent-child hierarchy of the first dataset, a second dataset, and a parent-child hierarchy of the second dataset according to some embodiments.

FIG. 3C illustrates blended result sets based on the FIG. 3A datasets according to some embodiments.

FIG. 4A illustrates a first data set exhibiting a first level hierarchy, and a second dataset exhibiting a second level hierarchy according to some embodiments.

FIG. 4B illustrates blended result sets based on the FIG. 4A datasets according to some embodiments.

FIG. 5A illustrates a first data set exhibiting a first level hierarchy of a first type, and a second dataset exhibiting a second level hierarchy of a second type according to some embodiments.

FIG. 5B illustrates blended result sets based on the FIG. 5A datasets according to some embodiments.

FIG. 6A illustrates a first data set exhibiting a first level hierarchy of a first type, and a second dataset exhibiting a second level hierarchy of a second type according to some embodiments.

FIG. 6B illustrates blended result sets based on the FIG. 6A datasets according to some embodiments.

FIG. 7A illustrates a first data set exhibiting a first level hierarchy of a first type, and a second dataset exhibiting a second level hierarchy of a second type according to some embodiments.

FIG. 7B illustrates blended result sets based on the FIG. 7A datasets according to some embodiments.

FIG. 8A illustrates a first data set exhibiting a first level hierarchy of a first type, and a second dataset exhibiting a time-based hierarchy according to some embodiments.

FIG. 8B illustrates blended result sets based on the FIG. 8A datasets according to some embodiments.

FIG. 9A illustrates a first data set exhibiting a first level hierarchy of a first type, and a second dataset exhibiting a time-based hierarchy according to some embodiments.

FIG. 9B illustrates blended result sets based on the FIG. 9A datasets according to some embodiments.

FIG. 10A illustrates a blended result set based on the FIG. 3A datasets according to some embodiments.

FIG. 10B illustrates a blended result set based on the FIG. 3A datasets according to some embodiments.

DETAILED DESCRIPTION

The following description is provided to enable any person in the art to make and use the described embodiments. Various modifications, however, will remain readily apparent to those in the art.

Figure 1:
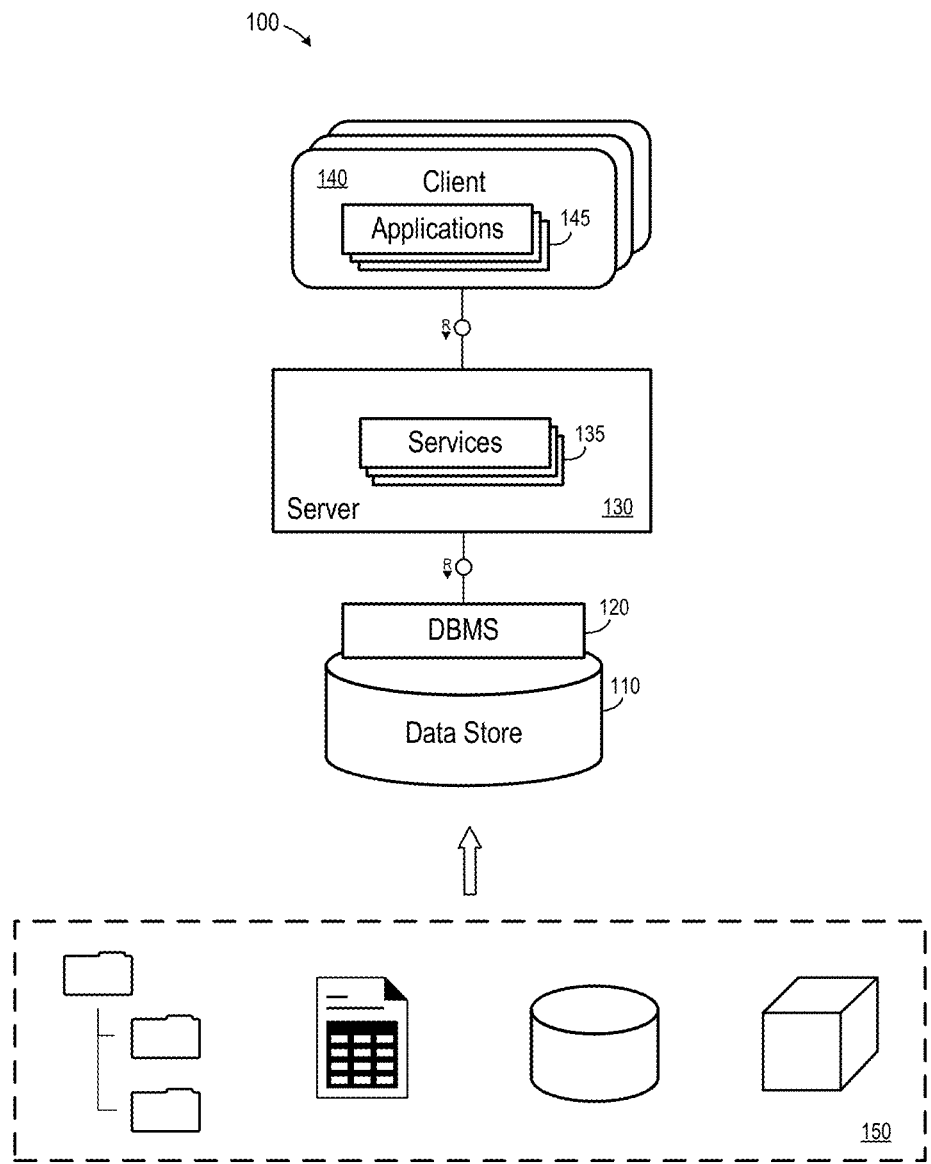
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140, applications 145, and data sources 150. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface, and the application 145 passes a request based on the query to one of services 135. An SQL script is generated based on the request and forwarded to DBMS 120. DBMS 120 executes the SQL script to return a result set based on data of data store 110, and the application 145 generates and displays a report/visualization based on the result set. The data may comprise two data sources in which at least one of the two data sources exhibits a dimension hierarchy, and the result set may be a blended result set as described herein.

In this regard, the query may leverage a semantic layer defining a set of objects. The semantic layer may be defined by metadata stored within data store 110 and/or a separate repository (not shown). Each object associates one or more physical entities (e.g., a physical database table, associated columns of one or more database tables, etc.) of data store 110 with user-friendly names. These objects may be classified as dimensions, along which one may perform an analysis or report (e.g., Year, Country, Product), or measures (e.g., Sales, Profit), whose values can be determined for a given combination of dimension values (e.g., 2006, U.S.A., Televisions). The metadata may also include information regarding dimension hierarchies (e.g., Country>State>City) and any other suitable metadata.

Accordingly, a user-generated query may include thusly-defined dimensions, dimension values and/or measures, and the metadata is used to execute the query with respect to the corresponding physical entities of data store 110. The query may also include other information such as filters.

Data sources 150 may comprise any sources of datasets which are or become known, including but not limited to database views, spreadsheets, relational databases and/or OnLine Analytical Processing cubes. According to some embodiments, new datasets from data sources 150 are occasionally stored within data store 110. Each type of data source 150 may require a particular Extract, Transform and Load process in order to store its data within data store 110. According to some embodiments, metadata describing these newly-loaded datasets is incorporated into the above-described semantic layer such that the datasets may be queried as described above. This metadata may be generated automatically and/or with the assistance of an administrator operating administration device 160, as will be described below.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may comprise any system to render visualizations. For example, a client 140 may execute a Web Browser to request and receive a Web page (e.g., in HTML format) from application server 130 via HTTP, HTTPS, and/or WebSocket, and may render and present the Web page according to known protocols. In another example, an application 145 may comprise a user interface component and an engine component. The user interface component transmits JavaScript calls to the engine component in response to user interactions and the engine component transmits corresponding HTTP calls to server 130. The engine component receives XML, HTML and/or JavaScript from server 130 in response, and provides corresponding HTML and custom style sheet (CSS) data to the user interface component for rendering thereby. Such an implementation may allow data exchange and presentation without requiring full page reloads.

The following description provides examples of blending two datasets in which at least one of the linking entities belong to a hierarchy. In some embodiments, various hardware elements of system 100 (e.g., one or more processing units of server 130 and/or DBMS 120) execute program code to perform blending as described below. In this regard, all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

An entity may be identified a flat dimension (e.g., a SalesPerson dimension), a level hierarchy (e.g., the month in the Year/Month Time hierarchy), a parent/child hierarchy (e.g., a Product hierarchy) or a part or combination of flat dimensions (e.g., the Month portion of a timestamp dimension, or string operations extracting and combining multiple dimensions).

Flat dimensions consist at least of a key column which provides the identity of the entity it represents. A flat dimension may also include non-unique attributes such as Description. For example, an Employee dimension may have an EmployeeID column as the key, and a EmployeeName column as the description, where EmployeeName is not necessarily a unique value (i.e., two employees may have identical names).

Level hierarchies consist of multiple ordered key columns and optional description columns. These columns provide both identity (through the use of the key columns together) and structure (through the ordering of the levels). In addition, a single level hierarchy can imply multiple entities based on all subsets starting with the same root (e.g., Level hierarchy Country/Region/Subregion/City also implies entities Country/Region/Subregion, Country/Region, and Country).

Parent/child hierarchies consist of one or more pairs of child and parent columns. The child column defines the identity of the entity, while the parent column defines a join to the child column (e.g., Employee as Child linking to Manager as Parent). This arrangement provides the structure of the hierarchy, recursively.

Part or combination of flat dimensions requires creation of a calculated dimension in order to expose the entity. For example, if a timestamp column includes data down to the millisecond, it is desirable to aggregate that data up to a higher level before blending. This requires creation of a new column derived from the timestamp column that exposes the desired entity granularity (e.g., day).

FIGS. 2A and 2B illustrate blending of a datasets in which a parent/child hierarchy of one dataset is linked against a flat dimension of another dataset. In particular, it may be desired to link Dataset 1 of FIG. 2A with Dataset 2 by Dataset1.Product(Parent hierarchy)=Dataset2.Prod. The Product dimension of Dataset 1 of FIG. 2A is defined by illustrated Hierarchy 1 and the Prod dimension of Dataset 2 is a flat dimension.

Result sets 210 through 250 of FIGS. 2B and 2C represent hierarchical blending according to some embodiments. Result set 210 reflects selection of Dataset 1 as the primary dataset and a query for Inventory, Sales by Product. It will be assumed that an option "Do not roll up secondary values up Product hierarchy" is also selected for the blending operation. Selection of this option indicates that the values from the secondary should be displayed as they would appear if querying secondary dataset by itself. Not selecting this option indicates that the secondary data should be incorporated at as low a level as possible (i.e., as if the secondary dataset was part of the primary dataset). Accordingly, the values would be "rolled up" (i.e., re-aggregated) after the join. In either case, blending is performed by joining the IDs of the Product parent/child hierarchy with the IDs of the Prod flat dimension, and executing the query against the joined data.

Due to the selected option of the present example, aggregation is not performed up from the point at which the join occurred. Since such aggregation has not occurred, the dimension Sales includes a placeholder of the count of data points (e.g., ((#))) under the (all) and Food nodes of the hierarchy. Moreover, values which do not have children are left as NULL (shown as "----"). Also of note is that the value of Sales for Vehicles and Instruments are calculated independently from their children, and Noseflutes exists as a value under Instruments, even though there are values for both in Dataset 2.

Result set 220 reflects selection of Dataset 1 as the primary dataset and a query for Inventory, Sales by Product. A SUM aggregation has been chosen to aggregate Sales up the Product hierarchy. Blending is again performed by joining the IDs of the Product parent/child hierarchy with the IDs of the Prod flat dimension, and executing the query against the joined data. The results of Sales for Vehicles, Bicycles and Unicycles, which are all lowest-level common nodes (i.e., without matching children), is identical to that shown in result set 210.

The Sales value for (all) and Food is aggregated up the product hierarchy (post-blend) using the aggregation method that is selected by the user (i.e., SUM), and ignoring the aggregation method of Dataset 2 (i.e., AVG). Since there is an aggregated value available for Instruments, this value is used instead of the posted value for Instruments in order to incorporate the data at as low a level as possible, per the user's intention. This results in the SUMed value of all instrument Sales (i.e., 45) instead of the value of instrument Sales posted in Dataset 2 (i.e., 50).

In this regard, a posted value is a value that exists on a parent and is not aggregated from its children. As one example, a manager hierarchy is considered in which each node represents an employee. All employees—including managers—are associated with a salary. This value can be considered a "posted" value on each of the managers. Moreover, salary can be aggregated, where each manager's value may be equal to the sum of her salary and the salary of all her subordinates.

Result set 230 reflects selection of Dataset 2 as the primary dataset and a query for Inventory, Sales by Prod. Since the hierarchy is in the secondary dataset (i.e., Dataset 1), the hierarchy is only used to establish values to join. For example, "Instruments" is not associated with a value in Dataset 1 unless it is produced by first aggregating up the hierarchy. As a result, the rows are returned in a flat structure matching the secondary dataset.

Result set 240 illustrates a blend in which Dataset 1 is the primary data source and the query is for Inventory, Sales by Product, Region, Manager. As described with respect to result set 210, an option "Do not roll up secondary values up Product hierarchy" has also been selected. Result set 240 is similar to result set 210 except for inclusion of some non-blended dimensions (non-hierarchical ones in this case). The non-linked dimensions from the primary are automatically expanded (with duplicate measures and dimension members where necessary) and the non-linked dimensions from the secondary are collapsed with placeholders.

Since the query specifies Product before Region before Salesperson, each hierarchy member has multiple dimension values below it. In this case, all possible regions appear in result set 240. With the split across a dimension that isn't part of the secondary data source, the placeholder Sales values for (all) and (Food) now have counts that do not clearly aggregate up (since the same datapoint can be counted under more than one value of the non-linked dimension). In particular, the "(all)" level EMEA has a count of 2, APJ has a count of 2, and NA has a count of 5. If you the Region dimension was removed, these would all collapse into a value of 5 since all of the datapoints counted for EMEA and APJ are duplicated with the datapoints counted for NA. This is similar to a DISTINCT COUNT aggregation.

For the reasons given above, placeholders are provided in the Manager column for secondary non-linked dimensions. These placeholders represent the number of unique dimension members that correspond to the linked dimension. Since the primary data source also has a non-linked dimension, these placeholders end up duplicated for multiple regions (i.e., for the same product). Members of the Manager dimension that could not be joined to the product hierarchy are not counted. For example, a count of ((2)) is provided for Food because, even though the data contains three values (D.A., Ralphie and Arnold), one of them (Arnold) is only found associated with Beans, which is not included (because of the left outer join) in this query.

In alternative implementations, a ((null)) dimension value may be used for all members coming from the other table. For example, such an implementation would result in three rows under Vehicles: APJ, ((null)), 50, -----; NA, ((null)), 5, -----; ((null)), Ms. Frizzle, -----, 75. Such a result set may avoid possibly-confusing duplications at the expense of verbosity. Such a result set would also not be collapsed and would show all values for both primary and secondary datasets. Further examples will assume the aforementioned join/duplication approach.

Result set 250 involves the same linkages and query as result 240, except that a SUM aggregation has been chosen to aggregate Sales up the Product hierarchy. This difference results in replacement of the placeholders and any posted values (e.g. the values for Instruments).

Figure 3B:
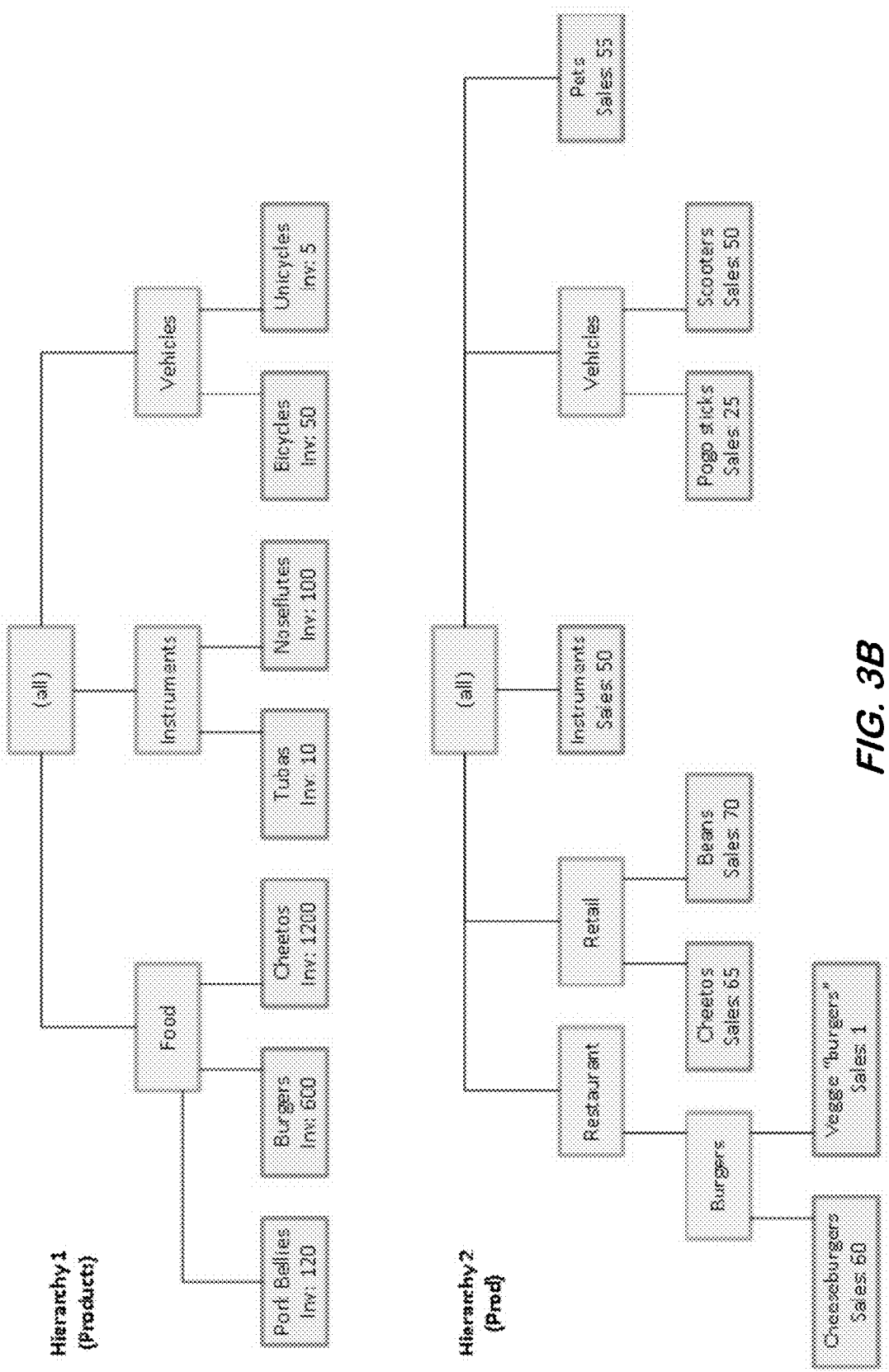
FIG. 3B illustrates the parent-child hierarchies of the first dataset and the second dataset of FIG. 3A according to some embodiments.
Figure 3C:
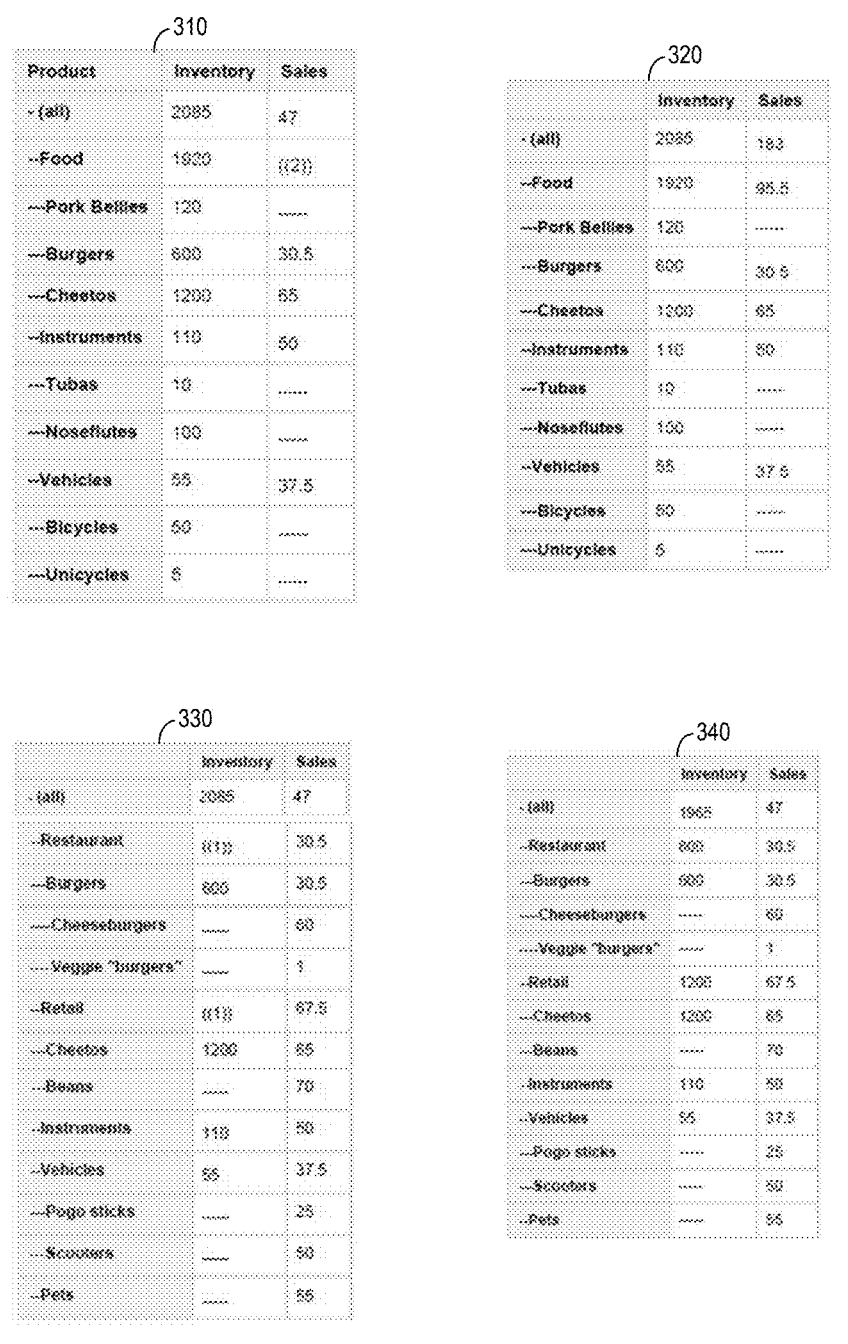

FIG. 3A illustrates Dataset 1 and Dataset 2 with dimensions conforming to respective parent/child hierarchies Hierarchy 1 and Hierarchy 2. FIG. 3B is a graphical illustration of Hierarchy 1 and Hierarchy 2, including the values of Dataset 1 and Dataset 2. Blending of these datasets occurs similarly to that described with respect to FIG. 2B with the addition that effectively every node and leaf in the secondary data source is considered a source of values for the secondary measure. Values of the secondary measure are aggregated up to the granularity necessary to join with the primary data source.

For example, result set 310 is generated by a blending operation in which Dataset 1 is the primary data source and the query is for Inventory, Sales by Product. Moreover, the option "Do not roll up secondary values up Product hierarchy" has been selected. In particular, blending is performed by joining the IDs of the parent/child hierarchy (both nodes and leaves) with the nodes and leaves of the secondary, but only taking the values if a corresponding primary value exists (i.e., a left outer join). All aggregation is pre-join so the AVG aggregation method defined in Dataset 2 for Sales is respected. After joining, all values in the secondary data source behave like posted values and are not aggregated within the primary data source's hierarchy.

The calculation of the aggregate (i.e., (all)) value of Sales includes all children—not just those in the primary data source. Accordingly, Pets is also included in the average Sales number. The nodes with no Sales value arise when a node and its children do not exist in the secondary hierarchy. Moreover, some nodes (e.g., Sales by Instrument) have values defined in the secondary data source that correspond to a parent node in the primary data source. In such a case, the value may be posted as-is. Finally, some nodes require aggregation of the secondary data source in order to successfully blend, such as Vehicles, in which the values below Vehicles are different and cannot be blended.

Result set 320 is generated by a blending operation in which Dataset 1 is the primary data source and the query is for Inventory, Sales by Product, and the aggregator SUM is selected to aggregate Sales up the hierarchy. Blending occurs as above, in which the lowest values may require secondary dataset aggregation (AVG) to arrive at a result. In the present example, this occurs when joining at a node level (e.g., Vehicles) or at a leaf level (e.g., Burgers). In the case of the Sales value for Burgers, rolling up to parent values that didn't exist in the secondary uses the selected aggregation method (SUM). In contrast, and in the case of the Sales value for (all), rolling up to parent values that do exist in the secondary requires choosing this rolled-up value over the one that would come directly from querying the secondary data source itself.

Result set 330 is generated with Dataset 2 as the primary data source and based on a query for Inventory, Sales by Product, in which the option "Do not roll up secondary values up Product hierarchy" has been selected. Result set 330 demonstrates similar behaviors as described above with respect to result set 310. For example, the lowest values (Inventory of Vehicles, Inventory of Instruments) may require secondary dataset aggregation (SUM) to arrive at a result, and nodes with no values arise when that node and its children do not exist in the secondary hierarchy. If a node with no value is a parent of a child with a value (e.g., Inventory of Restaurant, Inventory of Retail), then node will contain a placeholder for the number of real datapoints available underneath (if any). Some nodes (e.g., Inventory of Burgers) have values defined in the secondary data source that correspond to a parent node in the primary data source, and the value is posted there as-is.

Result set 340 is generated with Dataset 2 as the primary data source and based on a query for Inventory, Sales by Product, in which SUM is chosen to aggregate Sales up the hierarchy. Result set 340 demonstrates similar behaviors as described above with respect to result set 320. The one difference here is that the aggregation method of Dataset 2 is already SUM, so the aggregation that occurs when rolling up the primary hierarchy is consistent but (compared to the previous example) only includes values that are actually available after the join. In particular, Pork Bellies is not included when aggregating the value for the (all) node.

FIG. 4A illustrates Dataset 1 and Dataset 2 with dimensions conforming to different level hierarchies. The hierarchies exhibit similar levels in that all levels above a selected level are also blendable and linked. Blending of these datasets is therefore similar to a blend with multiple linked dimensions, where the dimensions must be used from the top down.

Blending commences by linking Dataset 1 and Dataset 2 by Dataset1.Product_Type=Dataset2.Type, Dataset1.Product_Category=Dataset2.Category. Result set 410 of FIG. 4B is a blend with Dataset 1 as the primary data source and a query for Sales, Inventory by Dataset1.Product_Color, Dataset2.Product. Other than determining what dimensions end up in the result, this case matches the non-hierarchical case when you consider Product Type and Product Category to be linked to their respective alternates.

The query for the bottom level of the hierarchy implies the automatic addition of the parent levels (i.e., Product_Type and Product_Category). Since those are our linked levels, it means that they can be used for blending. As in the non-hierarchical case, the values for Inventory from the secondary data source do not have Product Color so they are aggregated to the blend dimensions (Type and Category) and then duplicated across the product colors. A notification may be presented to the user to indicate that these are values copied.

Placeholders are used for the secondary dimension Product placeholders, as previously mentioned. As above, dimensions and measures for blend dimension values which are not found in the secondary are left null. If level is linked, all parent levels are automatically selected for linking. Linking only a middle level is not possible (other than linking it as a flat dimension). If only the top level were selected, the secondary values would be aggregated all the way to Product Type and duplicated four times.

Result set 420 is a blend with Dataset 2 as the primary data source and a query for Sales, Inventory by Dataset1.Product_Color, Dataset2.Product. Result set 420 is therefore similar to Result set 410, with switching of the dimensions. The one asymmetric change is that Toy Bicycles only has one value for color so a placeholder is not used.

Result set 430 is a blend with no primary (i.e., "a full outer join") and a query for Sales, Inventory by Dataset1.Product_Color, Dataset2.Product. As shown, the "all data" case is a Union of the above two cases, but with the non-linked dimensions collapsed into placeholders.

Figure 5A:
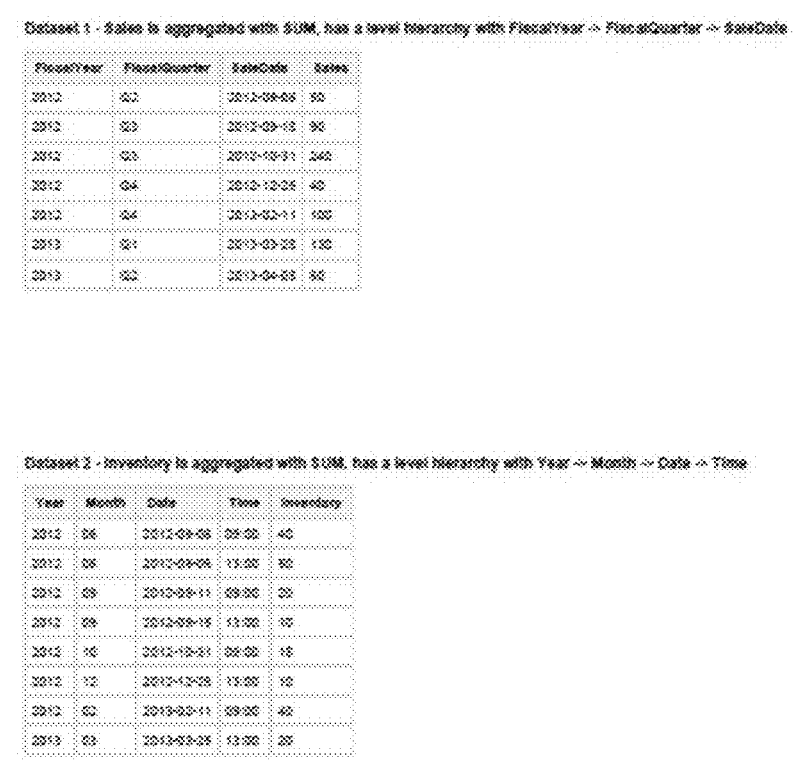
Figure 5B:
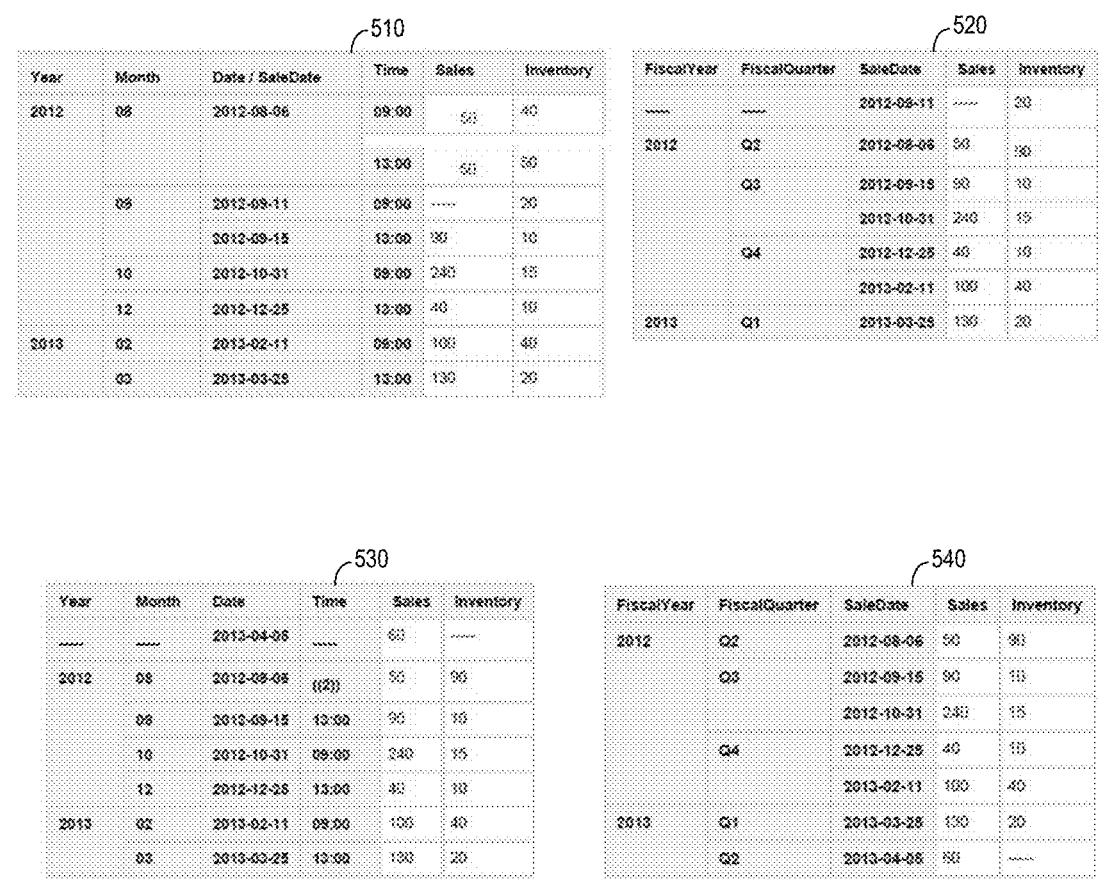

FIG. 5A illustrates Dataset 1 and Dataset 2 for illustrating blending into a level hierarchy based on unique values of a particular level. In a time hierarchy, this would comprise storing a calendar quarter level as "201501", for example, and not simply as "01" (which must have its parent in order to maintain uniqueness). In the present example, the blend is executed with that particular level as a flat dimension. However, the link dimension's presence in the hierarchy means that adding any level equal to or lower than the link automatically adds the link to the query. In the examples below, the datasets are linked by Dataset1.SaleDate=Dataset2.Date.

Result set 510 is a blend in which Dataset 2 is the primary data source and the query is for Sales, Inventory by Dataset2.Time. As described above, the query for the bottom level of the hierarchy implies the automatic addition of the parent levels. Since the Date level is linked, then Dataset 1's measure (Sales) can be linked in. The Time level (below the link) behaves like any non-linked dimension, which in this case causes duplicates of the Sales measures for Date 2012-08-06.

Result set 520 is a blend in which Dataset 2 is the primary data source and the query is for Sales, Inventory by Dataset1.SaleDate. This case shows Dataset 2's values against the hierarchy from Dataset 1. Since the blend dimension is part of that hierarchy, the values from Dataset 2 are aggregated up to that point. This shows an example where the values of the Time dimension are aggregated up to the level of the blend (i.e., Dataset2.Date which equals Dataset1.SaleDate). Missing values for 2012-09-11 in the secondary are shown as null. There is no way to determine from the data in Dataset 1 the FiscalQuarter or FiscalYear to which 2012-09-11 corresponds.

Result set 530 is a blend in which Dataset 1 is the primary data source and the query is for Sales, Inventory by Dataset2.Time. Like result set 520, result set 530 shows the data from the primary data source over the hierarchy from the secondary data source. This leads to some interesting results. For example, without any values for 2013-04-05 in Dataset 2, result set 530 doesn't have a Year, Month, or Time. The lack of Year and Month confuses the ordering as well. The Time level (below the link) behaves like any non-linked dimension. Here it results in a placeholder because Dataset2 is the secondary data source. Moreover, Inventory value for 2013-04-05 is null because there is no value in the secondary data source for this particular value of the primary data source.

To complete the sequence of examples based on the datasets of FIG. 5A, result set 540 is a blend in which Dataset 1 is the primary data source and the query is for Sales, Inventory by Dataset1.SaleDate.

FIG. 6A illustrates Dataset 1 and Dataset 2 for illustrating blending a level hierarchy based on fewer levels/dimensions than is needed to achieve uniqueness. This includes cases where blending occurs against a single dimension, if that single dimension does not have a unique mapping to a specific member of the hierarchy.

This disambiguation is triggered in the situations where the dimension in question is a parent of any of the linked dimensions, or the dimension would end up with more than one value for a given value of the linked dimension(s) in that hierarchy. In non-hierarchical cases, these multiple values would be either expanded or left collapsed with a placeholder. In the examples below, the datasets are linked by Dataset1.CustCity=Dataset2.City, Dataset1.CustCountry=Dataset2.Country, disambiguating Springfield to mean Springfield, Oreg.

Result set 610 illustrates a blend in which Dataset 1 is the primary data source and the query is for Sales, NumSalespeople by Dataset1.CustCity, and providing the disambiguation information. This requires the ability to pass down the disambiguation information to the backend as part of the blended query. Values that were not selected during disambiguation (i.e., Springfield, Ohio) are treated as if they are missing (hence NULL).

Result set 620 illustrates a blend in which Dataset 2 is the primary data source and the query is for Sales, NumSalespeople by Dataset1.CustCity, and providing the disambiguation information. With a hierarchy that is only partially mapped, we end up with some NULL values where the value is not known. Also, with Dataset2 as the primary (and the disambiguation information provided), only data for Springfield Oreg. is provided.

Result set 630 illustrates a blend in which Dataset 1 is the primary data source and the query is for Sales, NumSalespeople by Dataset2.City. Again, the disambiguation information is provided. Result set 630 includes two Springfields that are indistinguishable. Since one represents Springfield Ohio and one Springfield Oreg., the values that come from the primary dataset are used. The data does not provide an Area for Springfield Ohio. However, the data does specify that Springfield Ohio is in the US and the US is unambiguously in the NA area. Accordingly, that is what is shown. This is similar to non-hierarchical cases except that the result must be displayed in a hierarchical structure. It is a non-ambiguous case. If there is no mapping at all, then NULL is used. This is the case for countries that are not in Dataset 2: they have no clear definition for what Area they should have.

Result set 640 illustrates a blend in which Dataset 2 is the primary data source and the query is for Sales, NumSalespeople by Dataset2.City, with the disambiguation information being provided. Based on the disambiguation information, Springfield from Dataset 2 maps to Springfield Oreg., so no values from Springfield Ohio are included.

FIG. 7A illustrates Dataset 1 and Dataset 2 for illustrating the more general case of blending between a Level hierarchy and an arbitrary set of dimensions (or a different level hierarchy). Such general mapping requires a combination of straight dimension mapping and formulas in order to handle different formats. If these mappings prove to be ambiguous, a disambiguation user interface is provided to acquire user input needed to allow a proper join. In the examples below, the datasets are linked by Dataset2.City=SUBST ("% Dataset1.CustCity %, % Dataset1.CustRegion %"), Dataset1.CustCountry=Dataset2. Country.

Result set 710 of FIG. 7B is a blend with Dataset 1 as the primary data source and a query for Sales, NumSalespeople by Dataset1.CustCity. The operation follows the principles described above, with the difference that the mapping of dimensions is via a formula.

Result set 720 is a blend with Dataset 2 as the primary data source and a query for Sales, NumSalespeople by Dataset1.CustCity. Using a formula, the result is equivalent to doing a blend on a hidden calculated dimension. In this case, blending behaves as if Dataset 1 has a calculated dimension that follows the blend formula (SUBST("% Dataset1.CustCity %, % Dataset1.CustRegion %")). The blend formula is 1:1 (injective) for the values of the example. The formula would not be 1:1 if either CustRegion or CustCity could contain commas. That is, the following two cases both map to the same value: CustCity="A, B" and CustRegion="C"→City="A, B, C"; and CustCity="A" and CustRegion="B, C"→City="A, B, C". However, the mapping is not onto (surjective) since there are values of City that do not have equivalents in CustRegion/CustCity.

This example shows how the mapping from the formula can be reversed in cases where it is 1:1. Despite coming from Dataset 2 in combined form, Vancouver, BC was reverse-engineered into the column values that are being requested. There are no matching data in the primary, though, so a NULL value is determined for Sales.

The mapping between CustCity/CustRegion and City could not be done for New York/US because New York does not conform to the format XXXX, YYYY. As a result, NULL values are determined for both but a row is maintained for it since it is in the primary dataset. The mapping could be improved to allow for optional pieces (e.g., "SUBST("% Dataset1.CustCity %(, % Dataset1.CustRegion %)?")") which would not produce a value for Sales (since the other dataset doesn't have any data with CustRegion=NULL) but would allow CustCity to be set to "New York".

Figure 8B:
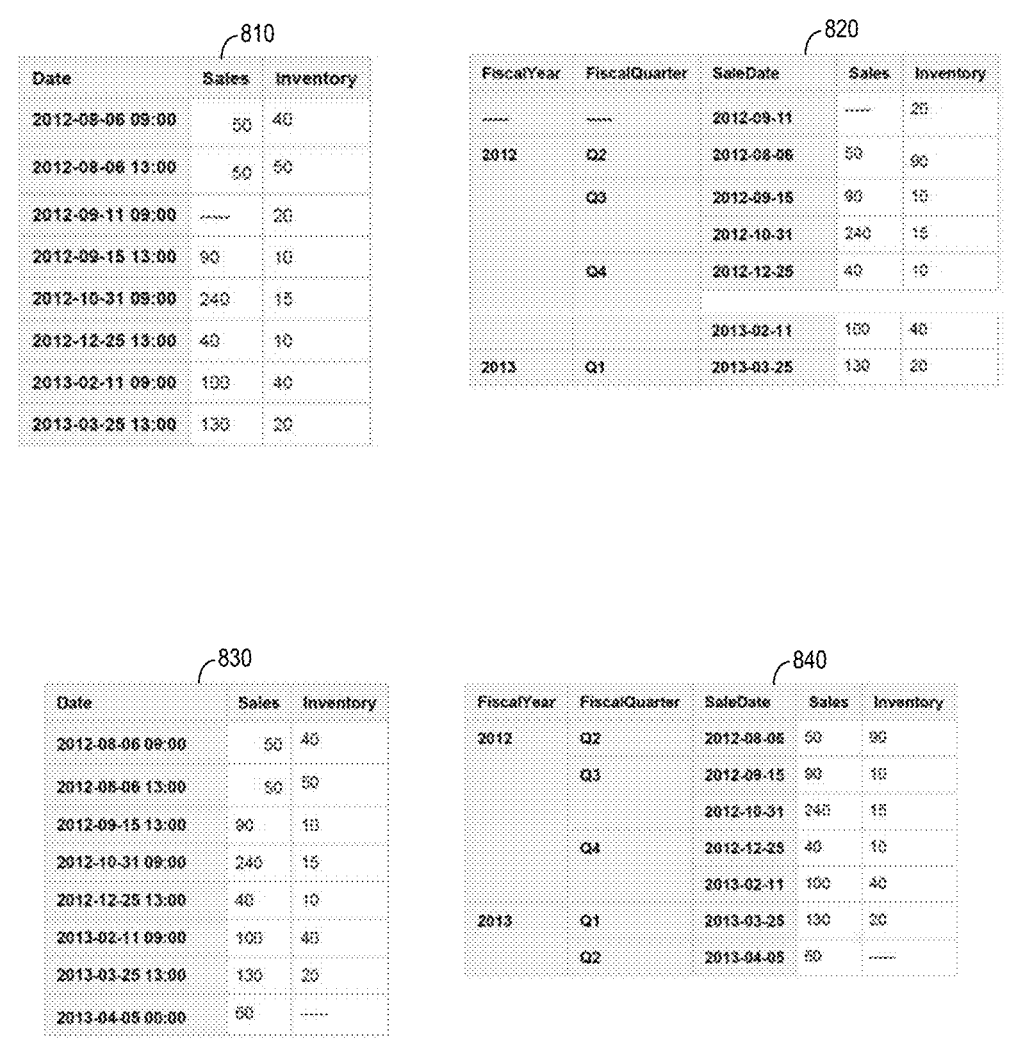

Result set 730 is a blend with Dataset 1 as the primary data source and a query for Sales, NumSalespeople by Dataset2.City. Here, Springfield, Ohio is mapped to its equivalent value for Dataset2.City. Result set 740, on the other hand, is a blend with Dataset 2 as the primary data source and a query for Sales, NumSalespeople by Dataset2.City. FIG. 8A illustrates Dataset 1 and Dataset 2 for presenting a time-specific example of the previous general blending case. While it is a specific case, it is called out because time is a common entity to blend on, and it is common for different datasets to structure time differently. In the examples below, Dataset 1 and Dataset 2 are linked by Dataset1.SaleDate=DATE(Dataset2.Date, "YYYY-MM-DD"). Although this represents a logical calculated dimension, it is also possible to explicitly require the user to create a dimension. Such a requirement may clarify the behavior of the blend. Result set 810 of FIG. 8B is a blend with Dataset 2 of FIG. 8A as the primary data source and a query for Sales, Inventory by Dataset2.Date. Other than the use of a formula for the blend, this example maps identically to previous examples.

Result set 820 is a blend with Dataset 2 as the primary data source and a query for Sales, Inventory by FiscalYear, FiscalQuarter, Dataset1.SaleDate. As with the previous scenario (blending arbitrary columns based on formula), blending on a formula behaves as if there is a hidden calculated dimension. In this case, Dataset 2 logically includes a calculated dimension that obeys the blending formula (DATE(Dataset2.Date,"YYYY-MM-DD")).

This blending proceeds similarly to the equivalent blending with level hierarchies on both sides. Unlike the previous formula-based example, this particular formula results in a many-to-one blend. That is, many values of Dataset2.Date map to the same value of Dataset1.SaleDate. In this case, this results in aggregation occurring when blending and including only dimensions from Dataset 1.

Because blending occurs on a logical (hidden) dimension and not the actual Date column, the two values on 2012-08-06 are aggregated together because they have the same value for the joined column. As mentioned above, this also happens in the level hierarchy case. Because of this hidden dimension, the primary data source still drives the shape of the data. Since the primary data source is Dataset 2, all values that are only in Dataset 2 appear but have been converted (using the conversion function in the link) to a date. However, a FiscalYear or FiscalQuarter is not generated for them since they do not appear in Dataset 2.

Result set 830 is a blend with Dataset1 as the primary data source and a query for Sales, Inventory by Dataset2. Date. Like the previous example, this is mapped directly from the similar results when blending based on unique values in levels. This demonstrates the challenge in dealing with formulas where the primary data source is one-to-many related to the secondary data source and the secondary dimensions (only) are shown.

Without a value for 2013-04-05 in the secondary dataset, the conversion picks some value for the time (in this case 00:00). Also, even though Dataset1 is the primary, both values for 2012-08-06 are not collapsed into a placeholder (since there would be no visible dimension value for that). Instead, the two rows are automatically expanded to show useful data.

Result set 840 is a blend with Dataset 1 as the primary data source and a query for Sales, Inventory by Dataset1.SaleDate. This example is also straightforward in view of previous examples.

Dataset 1 and Dataset 2 of FIG. 9A will be used to demonstrate blending on two timestamps. These examples potentially involve conversions on both sides. The datasets may be linked by DATE(Dataset1.SaleDate, "YYYY-MM")=DATE(Dataset2.Date, "YYYY-MM"). Again, the join may be alternatively performed by explicitly creating separate calculated dimensions and joining on those.

Result set 910 is a blend with Dataset 2 as the primary data source and a query for Sales, Inventory by Dataset2.Date. Note that blending straight on SaleDate=Date is theoretically possible but would exhibit little overlap (only one row). Instead, the blend is done with both sides having a formula. As a result, both datasets end up with a hidden calculated dimension that contains only the year and month. Clearly, this case is a many-to-many blend. The result is that things that would produce no values with a one-to-one blend actually produce the value aggregated up to the month. As shown in the first four rows, this blending results in some duplication where the primary data source ends up with more than one row for a month.

Result set 920 is a blend with Dataset 1 as the primary data source and a query for Sales, Inventory by Dataset1.SaleDate. This blending very similar to the reverse case (i.e., Dataset 2 as primary data source and query by Dataset2.Date). Before Inventory was joined to the results for Dataset 1, it needed to be aggregated to the month level.

This happens even though there is a value for 2012-08-06 that happens to be directly joinable between the two datasets.

When blending a level hierarchy with a parent-child hierarchy, the parent/child hierarchy may be treated like a single flat dimension containing the IDs of both nodes and leaves. Level hierarchies are matched against this list of nodes and leaves from the parent/child hierarchy using either a single unique level (if it exists) or some combination of levels. If the matching is not unique then disambiguation will need to occur, as mentioned previously. This may involve presenting the user with information such as the hierarchy structure (e.g., the parents of the current node) to assist the disambiguation. Once the link is defined, and if the parent/child hierarchy was chosen as the primary, then the roll up behavior matches the previously-described parent/child behavior.

Some embodiments implement full outer-joins of hierarchies. While the primary dataset hierarchy is applied as in the examples above, values that are in the secondary (and thus not in the hierarchy) are also included. The hierarchies are merged using the same join that the blend uses and the unmatched secondary nodes are added under the lowest common parent. If there is no common parent, then the nodes are dropped to a special top-level "Unassigned" node.

Result set 1010 of FIG. 10A is a blend with full outer join using the hierarchy of Dataset 1 of FIG. 3A and a query for Inventory, Sales by Product, and selecting the option "do not roll up secondary values up Product hierarchy". Result set 1010 doesn't show the Unassigned node because both sides include an (all) node. The Retail and Restaurant nodes added at the top level end up with a value of 67.5 to the selected "do not roll up" option, which is the default average aggregation of the Sales of Beans and Cheetos. Notably, these nodes have been aggregated from dimension members that are not found under them.

Result set 1020 of FIG. 10B is a blend with full outer join using the hierarchy of Dataset 1 of FIG. 3A and a query for Inventory, Sales by Product, and selecting SUM to aggregate Sales up the hierarchy. The roll up option brings the data in at as low a level as possible. Since the hierarchies have been merged (and thus have entries for every member in Dataset 2), the data is brought in at the leaf level. This results in the Sales for Vehicles being 75 (rolled up using SUM as requested), rather than 37.5. This option results in a more consistent-looking tree, however, since the aggregation is enforced consistently across all data that was brought in. Restaurant is omitted because it has no data associated with it under the new merged hierarchy.

Figure 11:
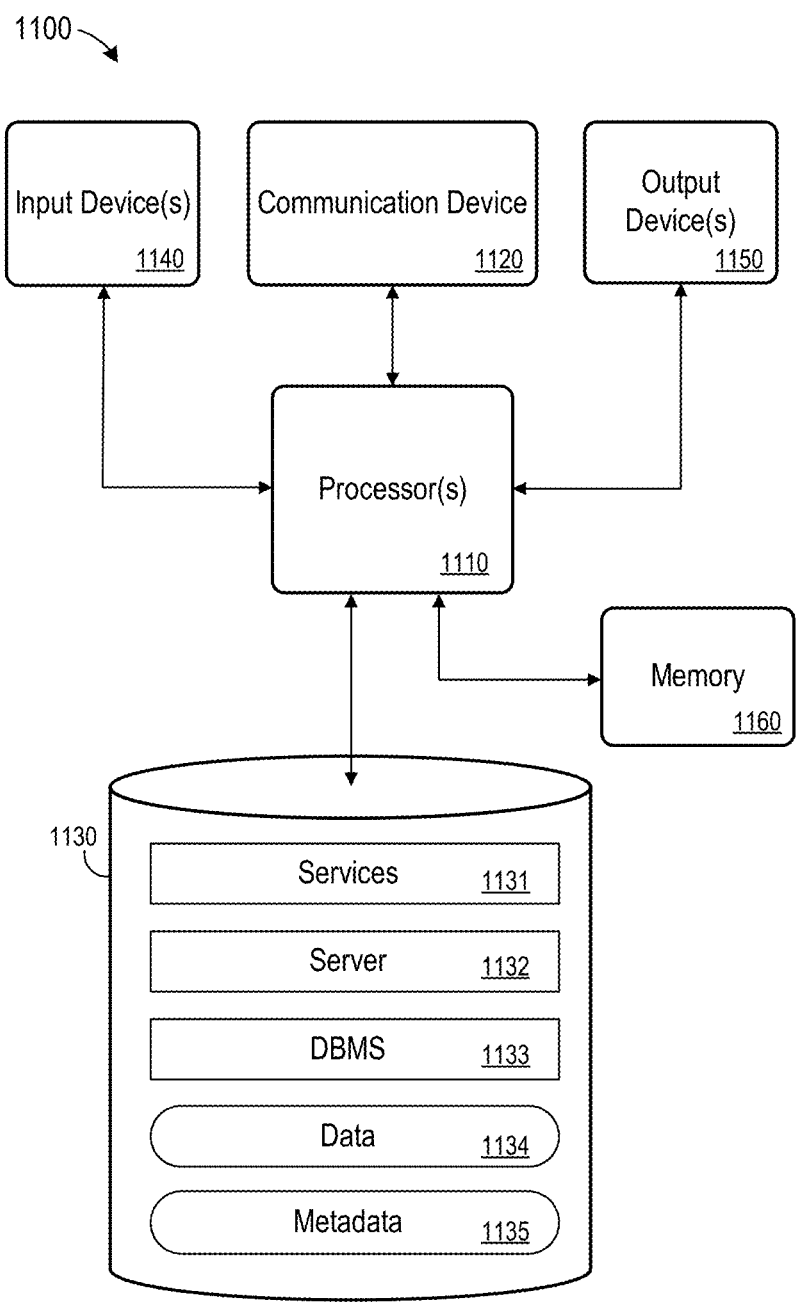
FIG. 11 is a block diagram of an apparatus according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of server 130, DBMS 120 and data store 110 of FIG. 1 in some embodiments. Apparatus 1100 may include other unshown elements according to some embodiments.

Apparatus 1100 includes processor(s) 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory.

Services 1131, server 1132 and DBMS 1133 may comprise program code executed by processor 1110 to cause apparatus 1100 to perform any one or more of the processes described herein. Embodiments are not limited to execution of these processes by a single apparatus.

Data 1134 and metadata 1135 (either cached or a full database) may be stored in volatile memory such as memory 1160. Metadata 1135 may include information regarding dimensions, dimension hierarchies, aggregations and measures associated with the data sources stored within data 1134. Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a data store storing a first data source and a second data source, the first data source comprising a plurality of dimensions and a first linking entity and the second data source comprising a second linking entity, the first linking entity is a first dimension key column of the plurality of dimensions that provides an identity of the first linking entity, the first linking entity is identified from two or more columns of the first data source defining a first hierarchy, and the second linking entity is a dimension key column that provides an identity of the second linking entity, the second linking entity is identified from one or more columns of the second data source; and a data server including one or more processing units to execute program code to:

receive a query including at least one of a dimension and a measure;

receive selection of one of the first data source and the second data source as a primary data set against which to execute the received query;

link the first data source and the second data source on the first linking entity and the second linking entity, wherein the linking comprises calculation of a formula to map the first linking entity to the second linking entity, and the mapping is based on the identity of the first linking entity matching the identity of the second linking entity, and wherein linking the first data source and the second data source joins corresponding values in the first linking entity and the second linking entity; and execute a blended query on the linked data sources to generate a result set, wherein the blended query is executed against the corresponding values in the joined first linking entity and the second linking entity.

2. A system according to claim 1, wherein the first hierarchy is a parent/child hierarchy.

3. A system according to claim 2, wherein the second linking entity is identified by two or more columns of the second data source defining a second hierarchy, and wherein the second hierarchy is a second parent/child hierarchy.

4. A system according to claim 1, wherein the first hierarchy is a level hierarchy.

5. A system according to claim 4, wherein the second linking entity is identified by two or more columns of the second data source defining a second hierarchy, and wherein the second hierarchy is a second level hierarchy.

6. A system according to claim 1, wherein the first linking entity and the second linking entity comprise a Time dimension.

7. A system comprising:
a client device comprising:
a first memory storing processor-executable process steps; and
a first processor to execute the processor-executable process steps to cause the client device to:
receive a database query over a first data source and a second data source, the first data source comprising a plurality of dimensions and a first linking entity and the second data source comprising a second linking entity, the first linking entity is a first dimension of the plurality of dimensions identified from two or more columns of the first data source defining a first hierarchy, and the second linking entity is a dimension identified from one or more columns of the second data source; and
a server comprising:
a second memory storing processor-executable process steps; and
a second processor to execute the processor-executable process steps to cause the server device to:
link the first data source and the second data source on the first linking entity and the second linking entity, wherein linking comprises calculation of a formula to map the first linking entity to the second linking entity and the mapping is based on the identity of the first linking entity matching the identity of the second linking entity, and wherein linking the first data source and the second data source joins corresponding values in the first linking entity and the second linking entity; and execute a blended query on the linked data sources based on the database query to generate a result set; and
transmit the result set to the client device.

8. A system according to claim 7, wherein the first hierarchy is a parent/child hierarchy.

9. A system according to claim 8, wherein the second linking entity is identified by two or more columns of the second data source defining a second hierarchy, and wherein the second hierarchy is a second parent/child hierarchy.

10. A system according to claim 7, wherein the first hierarchy is a level hierarchy.

11. A system according to claim 10, wherein the second linking entity is identified by two or more columns of the second data source defining a second hierarchy, and wherein the second hierarchy is a second level hierarchy.

12. A system according to claim 7, wherein the first linking entity and the second linking entity comprise a Time dimension.

13. A computer-implemented method comprising:
receiving, from a client device, a database query over a first data source and a second data source, the first data source comprising a plurality of dimensions and a first linking entity and the second data source comprising a second linking entity, the first linking entity is a first dimension of the plurality of dimensions identified from two or more columns of the first data source defining a first hierarchy, and the second linking entity is a dimension identified from one or more columns of the second data source;

linking the first data source and the second data source on the first linking entity and the second linking entity, wherein the linking comprises calculation of a formula to map the first linking entity to the second linking entity, and the mapping is based on the identity of the first linking entity matching the identity of the second linking entity, and wherein linking the first data source and the second data source joins corresponding values in the first linking entity and the second linking entity; and executing a blended query on the linked data sources based on the database query to generate a result set; and
transmitting the result set to the client device.

14. A method according to claim 13, wherein the first hierarchy is a parent/child hierarchy.

15. A method according to claim 14, wherein the second linking entity is identified by two or more columns of the second data source defining a second hierarchy, and wherein the second hierarchy is a second parent/child hierarchy.

16. A method according to claim 13, wherein the first hierarchy is a level hierarchy.

17. A method according to claim 16, wherein the second linking entity is identified by two or more columns of the second data source defining a second hierarchy, and wherein the second hierarchy is a second level hierarchy.

18. A system according to claim 1, further comprising program code to:
create a calculated dimension derived from at least one of the first linking entity and the second linking entity, wherein the calculated dimension exposes a desired granularity of the first linking entity; and wherein the blended query is executed using the calculated dimension.

* * * * *